March 29, 1938.  R. G. ANDERSON  2,112,730
JOURNAL BOX AND TRUCK FRAME CONSTRUCTION
Filed Jan. 6, 1937
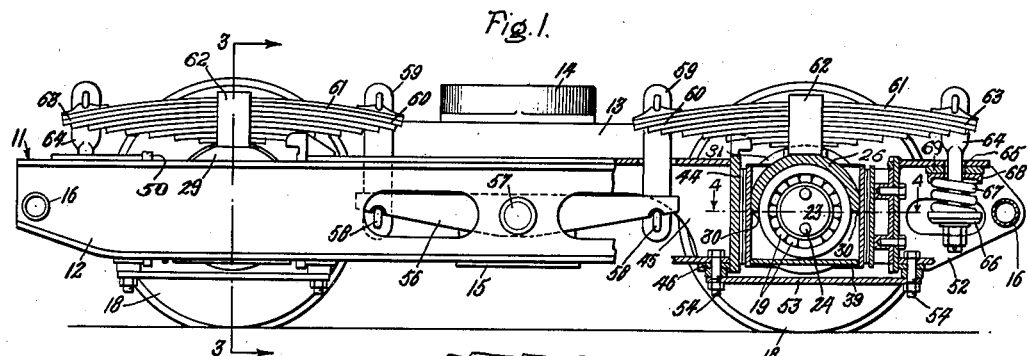
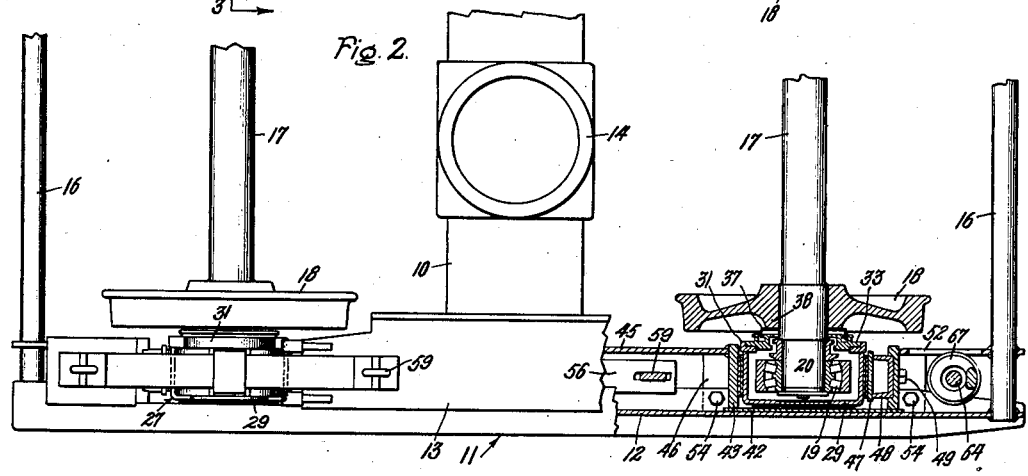
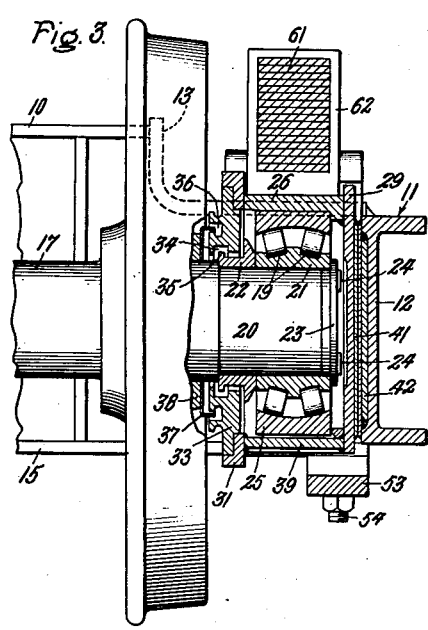
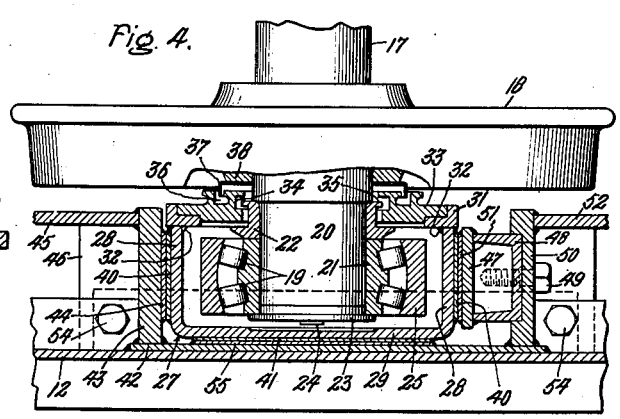
Inventor:
Robert G. Anderson,
by Harry E. Dunham
His Attorney.

Patented Mar. 29, 1938

2,112,730

UNITED STATES PATENT OFFICE 2,112,730

JOURNAL BOX AND TRUCK FRAME CONSTRUCTION

Robert G. Anderson, Erie, Pa., assignor to General Electric Company, a corporation of New York Application January 6, 1937, Serial No. 119,229

6 Claims. (Cl. 105—224)

My invention relates to railway frame and truck constructions for locomotives or cars.

In railway vehicles, such as locomotives or cars having a plurality of wheels and axles and a rigid car or truck frame, it is necessary to provide some arrangement for transmitting axial thrust on the axle to the frame in order to guide the truck in rounding curves. The side frames also must be constructed to carry the vehicle load and arranged to transmit this load to the vehicle wheels and axles.

An object of my invention is to provide an improved frame construction utilizing the full strength of the side frame to support the vehicle load and to improve and simplify the frame construction for transmitting end thrust of the axle to the frame.

Further objects and advantages of my invention will become apparent, and my invention will be better understood from the following description referring to the accompanying drawing, and the features of novelty which characterize my invention will be pointed out with particularity in the claims annexed to and forming a part of this specification.

In the drawing, Fig. 1 is a side elevation partly in section of an improved railway truck embodying my invention; Fig. 2 is a plan view, partially in section, of part of the truck shown in Fig. 1; Fig. 3 is a partial sectional view taken along line 3—3 of Fig. 1; and Fig. 4 is a partial sectional view on line 4—4 of Fig. 1.

Referring to the drawing, I have shown a railway vehicle truck provided with a bolster 10 extending between and supported on side frames 11. The side frames 11 include an I-beam section 12 to which is welded a longitudinally extending plate 13 arranged to support the brake rigging and the upper plate of the bolster 10. A center bearing 14 of any suitable construction is arranged on the bolster 10 for supporting a vehicle center bearing. The lower plate 15 of the bolster 10 is secured to the lower flange of the I-beam 12, and stay rods 16 are welded in openings in the ends of the side frames 11 and extend between the side frames on the two sides of the truck in order to make the truck structure more rigid.

The weight of the vehicle load is transmitted to the center bearing 14 by a vehicle center bearing and through the bolster 10 to the side frames 11. The truck is provided with a pair of axles 17 on each end of which is mounted a wheel 18 arranged to support the axles. Roller bearings 19 are mounted on the ends 20 of each of the axles 17 and the inner race 21 of the roller bearings is secured thereon between a sealing ring 22 and a disk 23 which is securely fastened on the end 20 of the axles by a pair of screws 24. An outer race 25 of the roller bearings 19 is arranged to support a journal box about the end of each axle. The journal box is a fabricated construction including a semi-cylindrical cover plate 26 which is supported on the outer race 25 of the roller bearings. A U-shaped plate 27 having axially extending vertical sides 28 and an outer vertically extending side 29 is secured to the semi-cylindrical cover plate 26 by welding, as shown at 30. This U-shaped plate forms the two axially extending sides, and the outer face of the journal box. A flanged plate 31 is secured to the inner ends of the sides 28 of the journal box by welding, as indicated at 32. An end plate 33 is secured to the flanged plate 31 and is provided with a groove 34 which is arranged about a flange 35 formed on the sealing ring 22, and cooperates therewith to exclude dust and dirt from the journal box. Another axially extending groove 36 is formed in the end plate 33 and a dust cap 37 is secured to the hub 38 of the wheel 18 and extends into the groove 36 in order to assist the sealing ring 22 in excluding dust and dirt from the journal box. A plate 39 is arranged across the bottom of the journal box and is welded between the plate 31 and the outer face 29 in order to form a closure at the bottom of the journal box. The U-shaped plate 27 forming the axially extending vertical sides and the outer face of the journal box is provided with bearing plates 40 secured by welding to the outer side of each of the vertical sides 28 and a bearing plate 41 secured by welding to the outer face 29 of the journal box. Each side frame is provided with two sets of fabricated pedestal jaws supported on a reenforcing plate 42 welded to the web of the I-beam 12, and the flanges of the I-beams are cut away to receive the fabricated journal boxes. One of the pedestal jaws of each set is formed by an axially extending vertical plate 43 welded to the reenforcing plate 42, and is provided with a bearing plate 44 welded thereto and arranged to engage the bearing plate 40 of the journal box. In order to reenforce the pedestal jaws 43, a tie bar 45 connects the inner ends of the two pedestal jaws 43 on each side frame and a plate 46 is welded across the bottom of the pedestal jaw 43 and to the end of the tie bar 45 and on the under side of the lower flange of the I-beam 12. Another pedestal jaw engages the other axially extending vertical side of the journal box and includes a plate 47 welded across the ends of a channel section member 48 which is adjustably secured by screws 49 to a vertically extending plate 50, and is provided with a bearing plate 51 arranged to engage the bearing surface 40 on the vertical side 28 of the journal box. The plate 50 is welded to the reenforcing plate 42, and a plate 52 connects the inner end of the plate 50 to the stay rod 16. In order to further reenforce the pedestal jaws, a tie bar 53 is secured by bolts 54 across the lower ends of each set of pedestal jaws. In this manner, it is not necessary to accurately machine pedestal jaws in the side frame, but the correct alinement of the pedestal jaws can be obtained by properly locating the plate 43 when it is welded to the web of the I-beam 12 forming the side frame, and an accurate alinement of the journal box within the pedestal jaws is assured by the adjustably secured pedestal jaw 47. With such a construction, the pedestal jaws are not subjected to any of the axial end thrust of the axle upon lateral movement of the truck frame with respect to the axle, but only take up the longitudinal forces between the truck frame and the journal box. In order to resist the end thrust of the axle set up by relative transverse movement between the truck side frames and the axles, a bearing plate 55 is welded to the inner side of the reenforcing plate 42 and arranged to engage the bearing plate 41 on the outer face of the journal box. In this manner, a large bearing surface is provided for taking up the end thrust of the axle upon the side frame by transmitting the end thrust directly to the side frame through the outer ends of the journal boxes, and the side frame is not weakened by having openings formed therein to accommodate the pedestal jaws. Furthermore, the distance from the longitudinal center line of the journal box to the longitudinal center line of the wheel hub is shorter than in the conventional construction, thereby decreasing the bending moment of the vehicle load on the axle, and permits the use of a smaller diameter axle.

In order to transmit the load upon the truck frame to the axle 17, a spring rigging is arranged to support the truck frame on the axle journal boxes. This spring rigging includes equalizer bars 56 pivotally connected to the web of the side frames 11 by pins 57. Each end of the equalizer bars 56 is pivotally supported on a pivot pin 58 from spring hangers 59 which engage the ends 60 of semi-elliptic springs 61. The semi-elliptic springs 61 are supported on the cover plate 26 of the journal boxes by a spring strap 62, and their outer ends 63 are resiliently connected to the outer ends of the side frames 11 by a spring link 64. This spring link extends through an opening 65 formed in the top of the side frame 11, and is provided at its lower end with a spring cap 66 on which a helical spring 67 is seated. The upper end of the spring 67 engages a spring seat 68 secured to the under side of a plate 69 which is connected to the top of the side frame 11. An advantage of this construction is that the overall height of the truck is decreased as the springs of the spring rigging are seated directly upon the journal box, thus making the space above the truck available to apparatus that may be suspended from the locomotive or car platform. Thus, it is seen that my improved and simplified truck construction is provided with the inherent advantage of permitting the use of the full strength of the side frame for supporting the vehicle load, and enables the use of a much lighter weight and lower truck construction.

While I have disclosed a particular embodiment of my invention, modifications thereof will occur to those skilled in the art. I desire it to be understood, therefore, that my invention is not to be limited to the particular arrangement described, and I intend in the appended claims to cover all modifications which do not depart from the spirit and scope of my invention.

What I claim as new and desire to secure by Letters Patent of the United States is:

1. A truck for locomotives or cars comprising side frames, an axle, a journal box arranged about each end of said axle, pedestal jaws secured to the inner side of said side frames and arranged to engage the sides of said journal boxes, and means for transmitting axial end thrust of said axle to said side frames directly through said journal boxes independently of said pedestal jaws.

2. A truck for locomotives or cars comprising side frames, an axle, journal boxes arranged about each end of said axle, pedestal jaws secured to the inside of each of said side frames and arranged to engage the sides of said journal boxes, and means providing a bearing surface carried by the inside of said side frame intermediate said pedestal jaws and engaging the outer face of said journal boxes for resisting end thrust of said axle on said side frames independently of said pedestal jaws.

3. A truck for locomotives or cars comprising side frame, an axle, journal boxes having a vertically extending outer face and arranged about each end of said axle, a bearing surface carried by the outer face of each of said journal boxes, pedestal jaws secured to said side frames and arranged to engage the sides of said journal boxes, and means including a bearing surface carried by the inner side of said side frames intermediate said pedestal jaws and arranged to engage said journal box outer face bearing surface for resisting axial end thrust of said axle.

4. A truck for locomotives or cars comprising side frames, an axle, a journal box having a U-shaped member forming axially extending vertical sides and an outer vertical face arranged about each end of said axle, a bearing surface carried by each of said axially extending sides and on the outer face of each of said journal boxes, pedestal jaws having bearing surfaces engaging said journal box side bearing surfaces and being secured to the inner side of said side frames, and means including a bearing surface secured to the inside of said side frames intermediate said pedestal jaws and engaging said journal box outer bearing surface for resisting axial end thrust of said axle.

5. A truck for locomotives or cars comprising side frames, an axle, journal boxes for said axle, pairs of pedestal jaws secured to the inside of said side frames and extending transversely thereof, one of each of said pairs of pedestal jaws being adjustably secured to said side frames, means including longitudinally extending members secured to said side frames and to the inner ends of said pedestal jaws for bracing said pedestal jaws, and means for resisting end thrust of said axle on said side frames independently of said pedestal jaws.

6. A truck for locomotives or cars having side frames, a bolster extending between and supported by said side frames, an axle, wheels for said axle, journal boxes arranged about each end of said axle, a spring rigging arranged to support said truck on said axle, pedestal jaws secured to said side frames and arranged to engage said journal boxes, and means for transmitting end thrust of said axle to said side frames directly through said journal boxes independently of said pedestal jaws.

ROBERT G. ANDERSON.